US008204215B2

(12) United States Patent
You et al.

(10) Patent No.: US 8,204,215 B2
(45) Date of Patent: Jun. 19, 2012

(54) METHOD AND APPARATUS FOR ENCRYPTING DATA

(75) Inventors: Yong-kuk You, Seoul (KR); Seong-soo Kim, Seoul (KR); Sang-su Choi, Hwaseong-si (KR); So-young Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1165 days.

(21) Appl. No.: 11/946,269

(22) Filed: Nov. 28, 2007

(65) Prior Publication Data

US 2008/0130881 A1 Jun. 5, 2008

Related U.S. Application Data

(60) Provisional application No. 60/872,501, filed on Dec. 4, 2006.

(30) Foreign Application Priority Data

Mar. 26, 2007 (KR) .................. 10-2007-0029367

(51) Int. Cl.
*H04L 9/00* (2006.01)
*H04L 29/06* (2006.01)

(52) U.S. Cl. ............ 380/28; 380/259; 380/262; 380/44; 713/150; 713/160

(58) Field of Classification Search .......... 713/150–153, 713/160–161, 168–171; 380/255–257, 259–260, 380/270–273, 277–280, 283, 44–47
See application file for complete search history.

(56) References Cited

U.S. PATENT DOCUMENTS

| 7,093,126 | B1* | 8/2006 | Jutla .............................. 713/168 |
| 7,406,595 | B1* | 7/2008 | Boyle et al. .................... 713/160 |
| 2001/0033656 | A1* | 10/2001 | Gligor et al. ..................... 380/28 |
| 2002/0044651 | A1* | 4/2002 | Tuvell ............................. 380/37 |
| 2002/0048364 | A1* | 4/2002 | Gligor et al. ..................... 380/37 |
| 2002/0172359 | A1* | 11/2002 | Saarinen ......................... 380/46 |
| 2003/0108196 | A1* | 6/2003 | Kirichenko ..................... 380/37 |
| 2004/0103279 | A1* | 5/2004 | Alten ............................. 713/160 |
| 2004/0131182 | A1 | 7/2004 | Rogaway |
| 2005/0021986 | A1* | 1/2005 | Graunke et al. .............. 713/193 |
| 2005/0201554 | A1* | 9/2005 | Kramer et al. .................. 380/28 |
| 2006/0020941 | A1* | 1/2006 | Inamura et al. ............... 718/100 |
| 2006/0023875 | A1* | 2/2006 | Graunke ......................... 380/28 |
| 2006/0159260 | A1* | 7/2006 | Pereira et al. .................. 380/44 |
| 2007/0055873 | A1* | 3/2007 | Leone et al. .................. 713/168 |
| 2007/0081670 | A1* | 4/2007 | Topham et al. ............... 380/239 |
| 2007/0106896 | A1* | 5/2007 | Sandberg et al. ............. 713/170 |
| 2007/0192594 | A1* | 8/2007 | Lee et al. ...................... 713/163 |

(Continued)

OTHER PUBLICATIONS

U.S. Appl. No. 60/204,510.*

(Continued)

*Primary Examiner* — Kim Vu
*Assistant Examiner* — Darren B Schwartz
(74) *Attorney, Agent, or Firm* — Sughrue Mion, PLLC

(57) ABSTRACT

A method of encrypting data is provided. The method includes dividing data in packet units into N data blocks; generating an initial counter value using a random number used for generating an encryption key for encrypting the data blocks; generating N counter values by increasing the initial value by a predetermined value N times and encrypting the N counter values using the encryption key; and performing an exclusive OR operation on the N encrypted counter values and the N data blocks.

30 Claims, 6 Drawing Sheets

U.S. PATENT DOCUMENTS

2008/0114994 A1* 5/2008 Iyer et al. .................. 713/193
2008/0170691 A1* 7/2008 Chang et al. ................ 380/270
2010/0067687 A1* 3/2010 Chandramouli et al. ....... 380/37

OTHER PUBLICATIONS

R. Tirtea and G. Deconinck. "Specifications overview for Counter Mode of Operation. Security Aspects in Case of Faults." In Electrotechnical Conference, 2004. MELECON 2004. Proceedings of the 12th IEEE Mediterranean, pp. 769-773 vol. 2, 2004.*

Menezes, Alfred J. et al. "Handbook of Applied Cryptography," 1997, CRC Press, p. 20.*

David Wagner, et al., "Comments to NIST Concerning AES Modes of Operations: CTR-Mode Encryption"; Sep. 2000, http://www.cs.udavis.edu/;rogaway/papers/ctr.pdf; see Review of Counter-Mode Encryption and Figure 1: Encryption and decryption process in counter mode; pp. 1-4.

* cited by examiner

<ENCRYPTION>

<DECRYPTION>

<ENCRYPTION>

<DECRYPTION>

METHOD AND APPARATUS FOR ENCRYPTING DATA

CROSS-REFERENCE TO RELATED PATENT APPLICATION

This application claims priority from U.S. Provisional Application No. 60/872,501, filed on Dec. 4, 2006 in the U.S. Patent and Trademark Office, and Korean Patent Application No. 10-2007-0029367, filed on Mar. 26, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to encrypting data, and more particularly, to encrypting data in a digital transmission content protection (DTCP) standard.

2. Description of the Related Art

The DTCP standard was developed as a protocol for audio/video (AV) data transmission protection between devices connected in accordance with the Institute of Electrical and Electronics Engineers (IEEE) 1394 standard, and has been extended for protection of AV data transmitted by universal serial bus (USB), media oriented systems transport (MOST), Bluetooth, or Internet protocol (IP). The original purpose of the DTCP standard was to transmit compressed AV data. However, the DTCP standard can also be used for transmitting all types of data regardless of their content format. Algorithms used for encrypting data in accordance with the DTCP standard include M6 and a cipher block chaining (CBC) mode of the advanced encryption standard (AES) using a 128-bit key. The CBC mode of AES is a more stable algorithm.

Currently, demands for communication of non-compressed AV data through a wireless communication system having a transmission rate of several gigabits per second (Gbps) by using a tens of gigahertz (GHz) band have increased, and thus related technologies are being actively developed. The DTCP standard can also be applied to the above-described data communication technologies. In this case, the size of the transmission data is large, requiring a high-speed encryption algorithm.

FIG. 1 is a diagram illustrating a related art encryption algorithm in a CBC mode of the AES, showing encryption and decryption processes.

In the encryption process, data is divided into 128-bit data blocks P1 through Pn, and AES encryption is performed respectively on the data blocks P1 through Pn.

The data block P1 is added to an initial value (IV) and then encrypted using an encryption key Ek, to generate encrypted data C1. The data block P2 is added to the encrypted data C1 and the result is encrypted using the encryption key Ek to generate encrypted data C2 is generated. In the same manner, encrypted data C1 through Cn is generated using the data blocks P1 through Pn.

The decryption process is the inverse process of the encryption process.

In the decryption process, the encrypted data C1 is decrypted using a decryption key Dk and the result is added to an initial value IV to obtain the data block P1. The encrypted data C2 is decrypted using the decryption key Dk and the result is added to the encrypted data C1 to obtain the data block P2. In the same manner, the data blocks P1 through Pn are obtained.

As described above, the related art encryption algorithm using the CBC mode of the AES requires more time for encryption and decryption. Additionally, each encryption or decryption is affected by the previous encryption or decryption result.

To solve the above-mentioned problem, a counter mode of the AES can be used.

FIG. 2 is a diagram illustrating a related art encryption algorithm in a counter mode of the AES, showing encryption and decryption processes.

In the encryption process, data is divided into 128-bit data blocks P1 through Pm, a number of counters t1 through tm corresponding to the number of the data blocks P1 through Pm are generated, and AES encryption is performed on the data blocks P1 through Pm using the counters t1 through tm.

In this case, the counters t1 through tm are predetermined values regardless of the data blocks P1 through Pm. In general, counters t2 through tm are set by adding 1 to the previous counter. For example, a counter t2 is set by adding 1 to an initial counter t1, and a counter t3 is set by adding 1 to the counter t2.

The counters t1 through tm are encrypted using an encryption key Ek and then an exclusive OR operation is performed on the encrypted counters t1 through tm and the data blocks P1 through Pm, respectively. Thus, encrypted data C1 through Cm are generated.

The decryption process is the inverse process of the encryption process.

In the decryption process, the counter t1 is encrypted using the encryption key Ek and then an exclusive OR operation is performed on the encrypted counter t1 and the encrypted data C1. Thus, the original data block P1 is obtained. Data blocks P2 through Pn may be obtained in the same manner as the data block P1.

The encryption algorithm in the counter mode of the AES does not rely on a previous AES encryption result, enabling parallel encryption and decryption and increasing encryption speed.

However, the counter mode of the AES is not included in the DTCP standard, and has weaknesses. The counters in the counter mode of the AES can be predicted in advance, and a third party can recreate original data from encrypted data if a plurality of data blocks are encrypted using the same encryption key and the same counter.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for encrypting data quickly and reliably in accordance with a DTCP standard.

According to an aspect of the present invention, there is provided a method of encrypting data, the method including dividing data in packet units into N data blocks; generating an initial counter value using a random number used for generating an encryption key for encrypting the data blocks; generating N counter values by increasing the initial value by a predetermined value N times and encrypting the N counter values using the encryption key; and performing an exclusive OR operation on the N encrypted counter values and the N data blocks.

Each of the counter values may include a bit for representing the random number, a bit for representing a transferred data block number, and a bit for representing a counter.

Each of the counter values may include a bit for representing the random number, a bit for representing an additional random number which is different from the random number, and a bit for representing a counter.

The method may further include generating a packet formed of a predetermined number of data blocks from among the N data blocks on which an exclusive OR operation is performed with the N encrypted counter values, and each of the counter values may include a bit for representing the random number, and a bit for representing partial information of the packet.

Each of the counter values may further include a bit for representing a counter.

The method may further include generating a packet formed of a predetermined number of data blocks from among the N data blocks on which an exclusive OR operation is performed with the N encrypted counter values, and each of the counter values may include a bit for representing the random number, a bit for representing a number of the packet, and a bit for representing a counter.

The method may further include generating a packet formed of a predetermined number of data blocks from among the N data blocks on which an exclusive OR operation is performed with the N encrypted counter values, and the initial counter value may be changed for each packet.

The initial counter value may be increased by a predetermined value for each packet.

The method may further include generating the encryption key, and the generating of the encryption key may include generating the encryption key based on copy control information of the data, the random number, and an exchange key shared by apparatuses for encrypting and decrypting data.

The random number may be periodically changed, and may be periodically increased by a predetermined value.

Each data block may be 128 bits, each counter value may be 128 bits, and the random number may be equal to or greater than 64 bits.

The packet may include a region which represents the random number, and may include a region which represents whether the random number is an odd number or an even number in order to represent whether the random number has changed.

According to another aspect of the present invention, there is provided an apparatus for encrypting data, the apparatus including a data division unit which divides data in packet units into N data blocks; a random number generation unit which generates a random number used for generating an encryption key for encrypting the data blocks; a counter generation unit which generates an initial counter value using the random number and generates N counter values by increasing the initial value by a predetermined value N times; an encryption unit which encrypts the N counter values using the encryption key; and an operation unit which performs an exclusive OR operation on the N encrypted counter values and the N data blocks.

The apparatus may further include a packet generation unit which generates a packet formed of a predetermined number of data blocks from among the N data blocks on which an exclusive OR operation is performed with the N encrypted counter values.

The apparatus may further include an encryption key generation unit which generates the encryption key, wherein the encryption key generation unit generates the encryption key based on copy control information of the data, the random number, and an exchange key shared by apparatuses for encrypting and decrypting data.

According to another aspect of the present invention, there is provided a computer readable recording medium having recorded thereon a computer program for executing a method of encrypting data, the method including dividing data in packet units into N data blocks; generating an initial counter value using a random number used for generating an encryption key for encrypting the data blocks; generating N counter values by increasing the initial value by a predetermined value N times and encrypting the N counter values using the encryption key; and performing an exclusive OR operation on the N encrypted counter values and the N data blocks.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY
EMBODIMENTS OF THE INVENTION

The present invention will now be described in detail by explaining exemplary embodiments of the invention with reference to the attached drawings.

Figure 1:
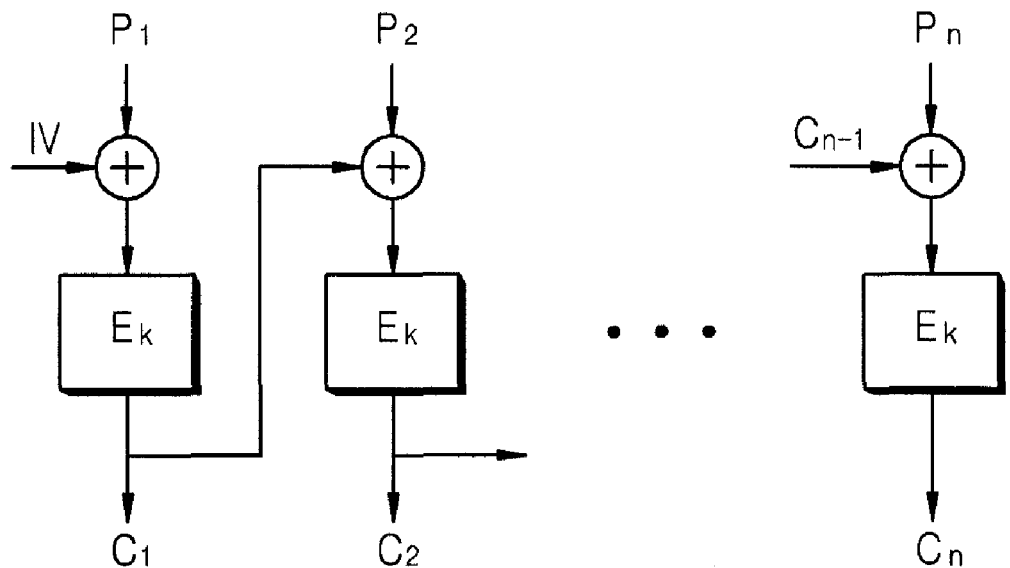
FIG. 1 is a diagram illustrating a related art encryption algorithm in a CBC mode of the AES.
Figure 1:
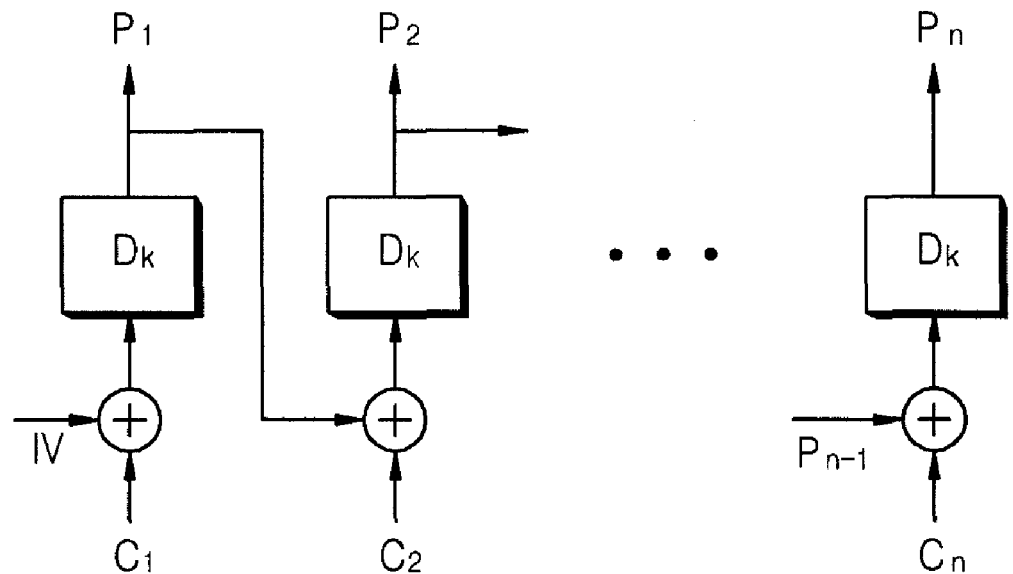
Figure 2:
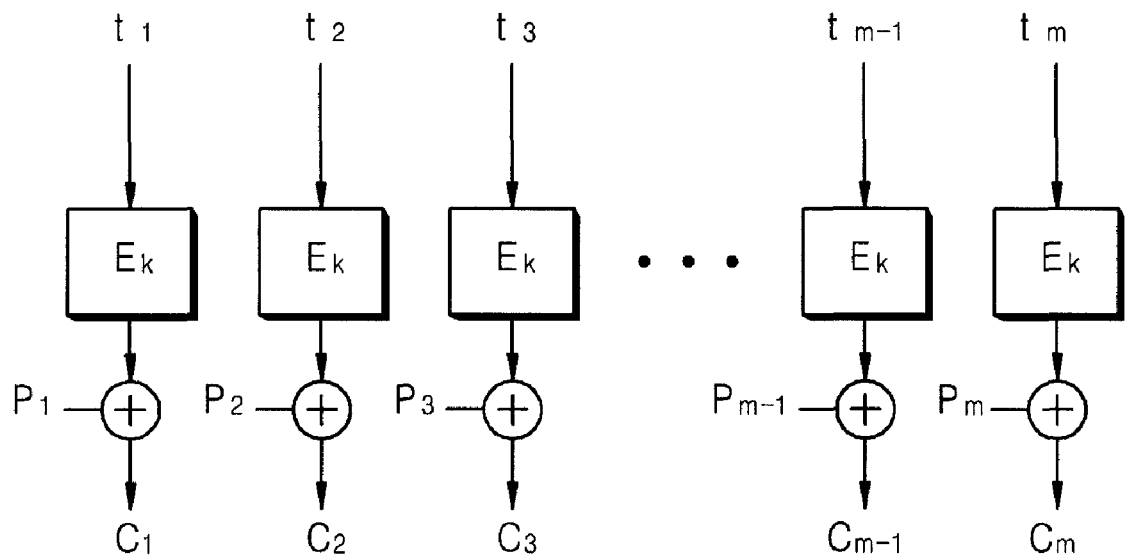
FIG. 2 is a diagram illustrating a related art encryption algorithm in a counter mode of the AES.
Figure 2:
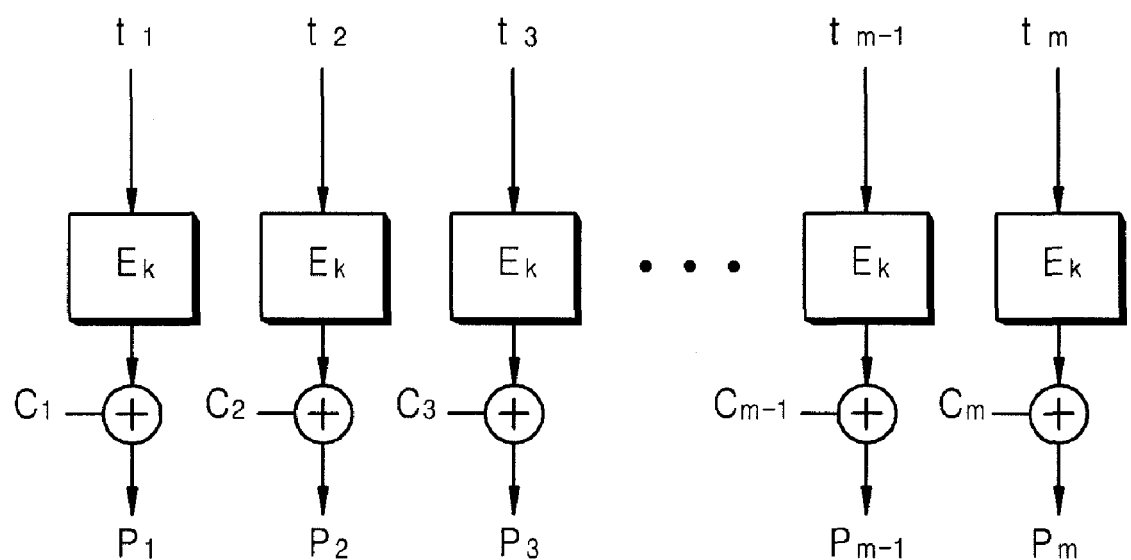
Figure 3:
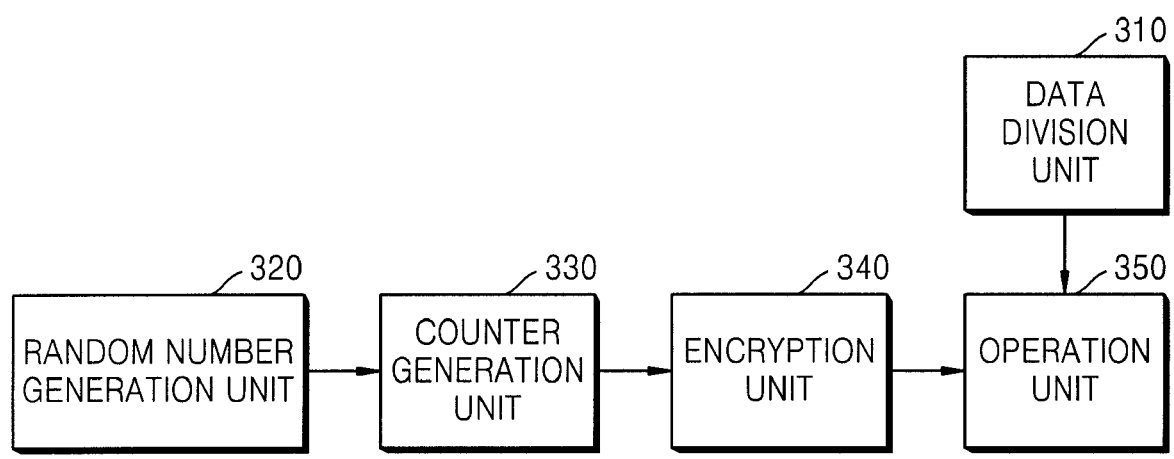
FIG. 3 is a diagram of an apparatus for encrypting data, according to an exemplary embodiment of the present invention.

FIG. 3 is a diagram of an apparatus for encrypting data, according to an exemplary embodiment of the present invention.

Referring to FIG. 3, the apparatus includes a data division unit 310, a random number generation unit 320, a counter generation unit 330, an encryption unit 340, and an operation unit 350.

The data division unit 310 divides data in packet units into N data blocks. N is a natural number equal to or greater than 2.

In this case, the data may be divided into 128-bit data blocks according to the current exemplary embodiment, but the present invention is not limited thereto. The data may also be divided into different sized data blocks.

The random number generation unit 320 generates a random number to be used to generate an encryption key for encrypting the data blocks.

The random number may be periodically increased by a predetermined value, for example, 1. In this case, a plurality of data blocks may be encrypted using the same encryption key generated using the same random number.

Preferably, the apparatus for encrypting data according to an exemplary embodiment of the present invention may further include an encryption key generation unit (not shown) which generates an encryption key. The encryption unit 340 encrypts a counter value using the encryption key generated by the encryption key generation unit.

The encryption key generation unit generates the encryption key based on copy control information of the data, the random number, and an exchange key shared by the apparatus for encrypting data according to an exemplary embodiment of the present invention and an apparatus for decrypting data which decrypts the data encrypted by the apparatus for encrypting data.

The encryption key generation unit periodically and randomly generates the exchange key, and the random number generation unit also periodically and randomly generates the random number.

In this case, the cycle for generating the random number is shorter than the cycle for generating the exchange key. That is, the random number is generated more frequently than the exchange key.

Based on the exchange key and the random number generated as described above and the copy control information of the data, the encryption key may be generated using a function shared by the apparatuses for encrypting and decrypting data, as in Mathematical Formula 1.

$$K_C = J-AES(K_X, f[EMI]_x N_C)$$
Where:
$$f[EMI]\{$$
$$f[EMI] = C_a \text{ when } EMI = \text{Mode } A$$
$$f[EMI] = C_b \text{ when } EMI = \text{Mode } B \quad (1)$$
$$f[EMI] = C_c \text{ when } EMI = \text{Mode } C$$
$$\}$$

J-AES represents the function shared by the apparatuses for encrypting and decrypting data, Kx represents the exchange key, EMI (encryption mode indicator) represents the copy control information of the data, and Nc represents the random number.

In this case, f[ ] is an operator which converts each EMI into an appropriate constant. For example, f[ ] may convert a 2-bit EMI into a 96-bit constant.

Additionally, the EMI may have a plurality of modes. For example, 'copy-never', 'copy-one-generation', and 'no-more-copy' may be set respectively to Modes A, B and C.

An encryption key Kc is changed in accordance with the mode of EMI, and changes of the exchange key Kx and the random number Nc.

When the encryption key is generated by the apparatus for encrypting data as described above, the apparatus for decrypting data also has to have the encryption key in order to decrypt the data encrypted using the encryption key.

A method of generating the encryption key, performed by the apparatus for decrypting data, will now be described.

The apparatus for encrypting data periodically and randomly generates the exchange key, encrypts the exchange key using an authentication key shared by the apparatuses for encrypting and decrypting data, and transfers the encrypted exchange key to the apparatus for decrypting data.

The apparatus for decrypting data decrypts the encrypted exchange key using the authentication key and extracts the exchange key.

Then, the apparatus for encrypting data periodically and randomly generates the random number and transfers the random number to the apparatus for decrypting data. However, under certain circumstances, the random number is not separately transferred but is recorded in a header of a packet when the apparatus for encrypting data transfers data in the form of a packet to the apparatus for decrypting data. When the packet is transferred, the EMI, which is the copy control information of the data, is recorded and transferred in the packet.

Figure 4:
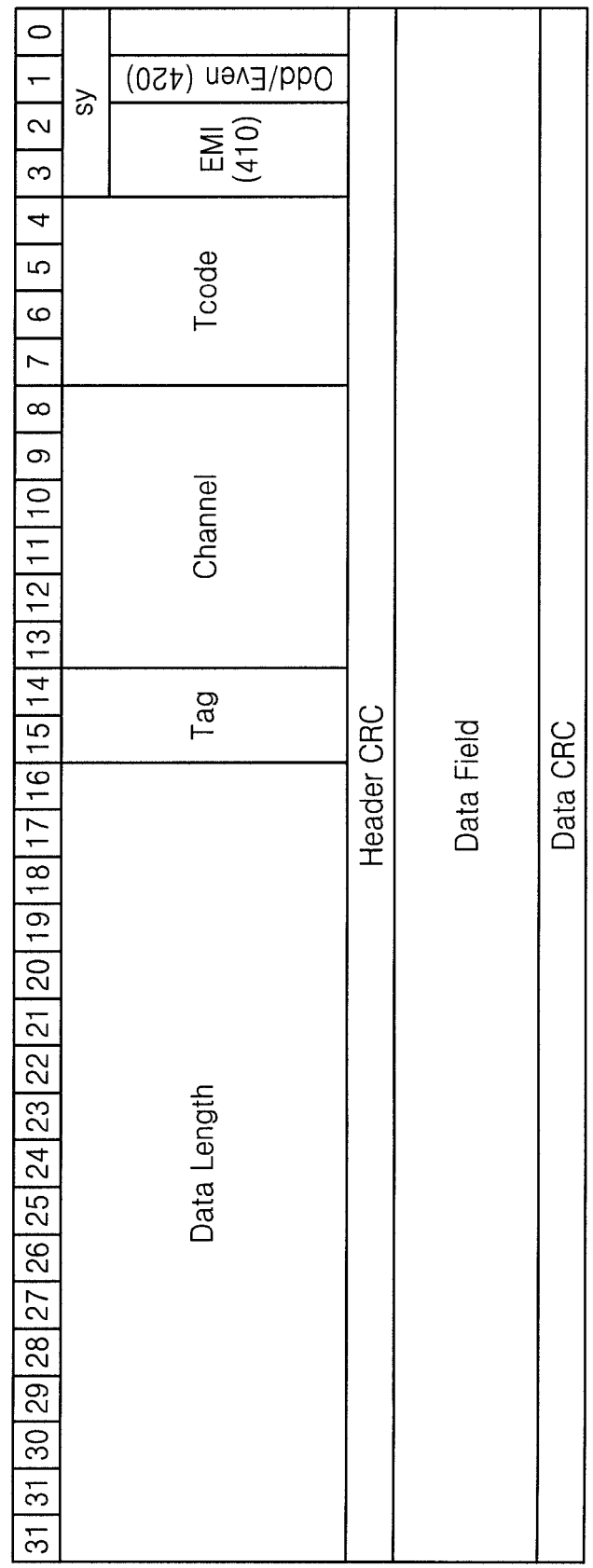
FIG. 4 is a diagram showing the structure of a packet in accordance with a DTCP/IEEE 1394 standard.

FIG. 4 is a diagram showing the structure of a packet in accordance with a DTCP/IEEE 1394 standard.

FIG. 4 shows an EMI region 410 and an Odd/Even region 420. The EMI region 410 represents an EMI, which is copy control information of data in a header of the packet, and the Odd/Even region 420 represents whether a random number is an odd number or an even number in order to represent whether the random number has changed.

The above-described packet does not have a region which represents the random number itself, and it is assumed that a counter value is increased by a predetermined value in a counter mode. For example, if the counter value increases by 1, odd and even numbers are represented alternately in the Odd/Even region 420.

Figure 5:
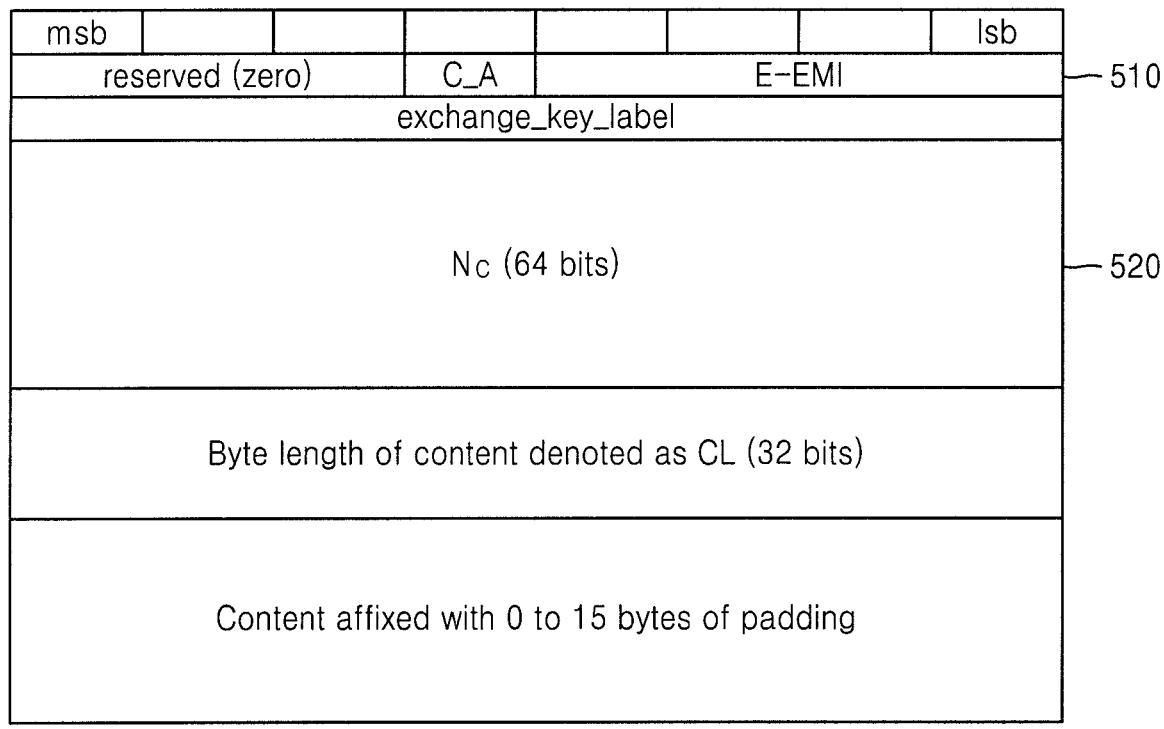
FIG. 5 is a diagram showing the structure of a packet in accordance with a DTCP/IP standard.

FIG. 5 is a diagram showing the structure of a packet in accordance with a DTCP/IP standard Referring to FIG. 5, a header of the packet includes an extended encryption mode indicator (E-EMI) region 510 which represents an EMI, which is copy control information of data, and a random number region 520 which represents a random number.

Here, the EMI region 410 illustrated in FIG. 4 is 2 bits, while the E-EMI region illustrated in FIG. 5 is 4 bits and may include more modes than the EMI region 410 illustrated in FIG. 4.

The random number region 520 represents the random number $N_c$ generated by the random number generation unit 320 illustrated in FIG. 3. The random number $N_c$ may be 64 bits as in FIG. 5.

Referring back to FIG. 3, the apparatus for decrypting data uses the exchange key, the random number, and the copy control information of the data generated as described above to generate an encryption key which is identical to the encryption key of the apparatus for encrypting data and is also used for decrypting the encrypted data.

The counter generation unit 330 generates an initial counter value using the random number generated by the random number generation unit 320, and generates N counter values by increasing the initial counter value by a predetermined value N times.

According to an exemplary embodiment of the present invention, the random number used for generating the encryption key is reused for generating the counter value. Accordingly, a fewer number of operations are required in comparison with the case when a random number for generating an encryption key and a random number for generating a counter value are generated separately.

The detailed operation of the counter generation unit 330 will be described later with reference to Mathematical Formulae 2 through 6.

The encryption unit 340 encrypts the N counter values into encryption keys.

The operation unit 350 encrypts each of the data blocks by performing an exclusive OR operation on the encrypted counter values and the data blocks.

The operation of the counter generation unit 330 will now be described.

First, the counter generation unit 330 generates the initial counter value which may be formed as in Mathematical Formula 2.

$$N_c | count \quad (2)$$

Here, $N_c$ represents the random number, and count represents a counter.

For example, if the initial counter value is 128 bits, it may be formed of a 64-bit random number and a 64-bit counter. In this case, the counter may be disposed in front of the random number.

The counter count may start at 0 but is not limited thereto.

The counter values are determined by increasing the counter of Mathematical Formula 2 by the predetermined value. For example, if the counter is 4 bits and the counter of the initial counter value is 0000, the counter may be changed and increased by 1 to 0001, 0010, 0011 and so on. However, if the counter is increased to 1111, the next value of the counter 1111 is 0000 again.

The counters may repeat the same values after they return again to 0000 as in the above-described example.

In the encryption algorithm using the counter mode of the AES, a third party can recreate original data from encrypted data if a plurality of data blocks are encrypted using the same encryption key and the same counter.

Accordingly, if the random number is not changed and only the counter is changed, the same counter value may be reused while the encryption key is not changed. Therefore, the counter generation unit 330 needs to generate the counter values by changing composition forms of the counter values such that the same encryption keys do not have the same counter value.

Examples of the counter values generated by changing values in order to prevent the counter generation unit 330 from reusing the same counter value will now be described.

First, the counter generation unit 330 may generate the counter value to include a bit for representing a random number $N_c$, a bit for representing a number of transferred data blocks $datablock_{no}$, and a bit for representing the counter count as in Mathematical Formula 3.

In this case, if the random number $N_c$ is changed, $datablock_{no}$ is recalculated from when the random number $N_c$ is changed. Accordingly, $datablock_{no}$ of a first data block after the random number $N_c$ is changed is set to 0.

$$N_c | datablock_{no} | count \qquad (3)$$

For example, the counter value may include a bit for representing a 64-bit random number, a bit for representing a 32-bit transferred data block number, and a bit for representing a 32-bit counter.

In this case, $datablock_{no}$ of a counter for encrypting a data block after 100 data blocks are transferred is 101. Thus, each data block has a different value of $datablock_{no}$, and the same counter value is not used for the same encryption keys when the data is encrypted.

If the data is formed in packets, $datablock_{no}$ is represented in a header of the packet, transferred to the apparatus for decrypting data, and used for calculating the counter value required for decrypting the packet.

Preferably, but not necessarily, the apparatus for encrypting data according to an exemplary embodiment of the present invention may further include a packet generating unit (not shown) which generates a packet including a predetermined number of data blocks. In this case, each data block is included in the packet after an exclusive OR operation is performed on the data block and the counter value encrypted using the encryption key.

Also, the counter generation unit 330 may generate the counter value to include a bit for representing the random number $N_c$, a bit for representing an additional random number $N_{c2}$ which is different from the random number $N_c$, and a bit for representing the counter count as in Mathematical Formula 4.

Here, if the additional random number $N_{c2}$ is identical to the random number $N_c$, the additional random number $N_{c2}$ is changed. If the random number $N_c$ is changed, the additional random number $N_{c2}$ may not be changed.

$$N_c | N_{c2} | count \qquad (4)$$

For example, the counter value may include a bit for representing a 64-bit random number, a bit for representing a 32-bit additional random number, and a bit for representing a 32-bit counter.

In this case, the random number generation unit 320 has to generate the additional random number $N_{c2}$ as well as the random number $N_c$ for generating the encryption key. Accordingly, more operation is required than in the case when only one random number $N_c$ is generated. However, since two random numbers $N_c$ and $N_{c2}$ are used, the operation is more stable than when only one random number $N_c$ is used.

If the data is formed in packets, the additional random number $N_{c2}$ is represented in the header of the packet, transferred to the apparatus for decrypting data, and used for calculating the counter value required for decrypting the packet.

Alternatively, the counter generation unit 330 may generate the counter value to include a bit for the random number $N_c$, a bit for representing a packet number $packet_{no}$, and a bit for representing the counter count as in Mathematical Formula 5.

$$N_c | packet_{no} | count \qquad (5)$$

For example, the counter value may include a bit for representing a 64-bit random number, a bit for representing a 32-bit packet number, and a bit for representing a 32-bit counter.

In this case, the packet number $packet_{no}$ of the counter value to be used for encrypting a data block included in a first packet is 1 and the packet number $packet_{no}$ of the counter value to be used for encrypting a data block included in a second packet is 2.

In this case, if the random number $N_c$ is changed, $packet_{no}$ is recalculated from when the random number $N_c$ is changed. Accordingly, $packet_{no}$ of a first packet after the random number $N_c$ is changed is set to 1.

Thus, the same counter value is not used for the same encryption keys when the data is encrypted.

If the data is formed in packets, $packet_{no}$ is represented in the header of the packet, transferred to the apparatus for decrypting data, and used for calculating the counter value required for decrypting the packet.

Also, the counter generation unit 330 may generate the counter value to include a bit for the random number $N_c$ and a bit for representing partial information $data_{part}$ of a packet as in Mathematical Formula 6.

$$N_c | data_{part} \qquad (6)$$

For example, the counter value may include a bit for representing a 64-bit random number, and a bit for representing 64-bit partial information of the packet.

The partial information of the packet can be used as the counter value because information of each packet has randomness and the counter value can be kept different from other counter values using the randomness.

Also, a counter may be further included in the counter value of Mathematical Formula 6. For example, the counter value may include a bit for representing a 64-bit random number, a bit for representing 32-bit partial information of the packet, and a bit for representing a 32-bit counter.

Furthermore, the counter generation unit 330 may determine the initial counter value to be changed for each packet.

That is, the random number $N_c$ of the initial counter value of Mathematical Formula 2 is changed for each packet.

In this case, whenever the random number $N_c$ is changed, the encryption key is newly generated. Accordingly, additional operation for generating the random number $N_c$ and the encryption key is required for each packet.

The random number $N_c$ may be changed by adding a predetermined value for each packet.

Examples of counter values are not limited to Mathematical Formulae 2 through 6.

Figure 6:
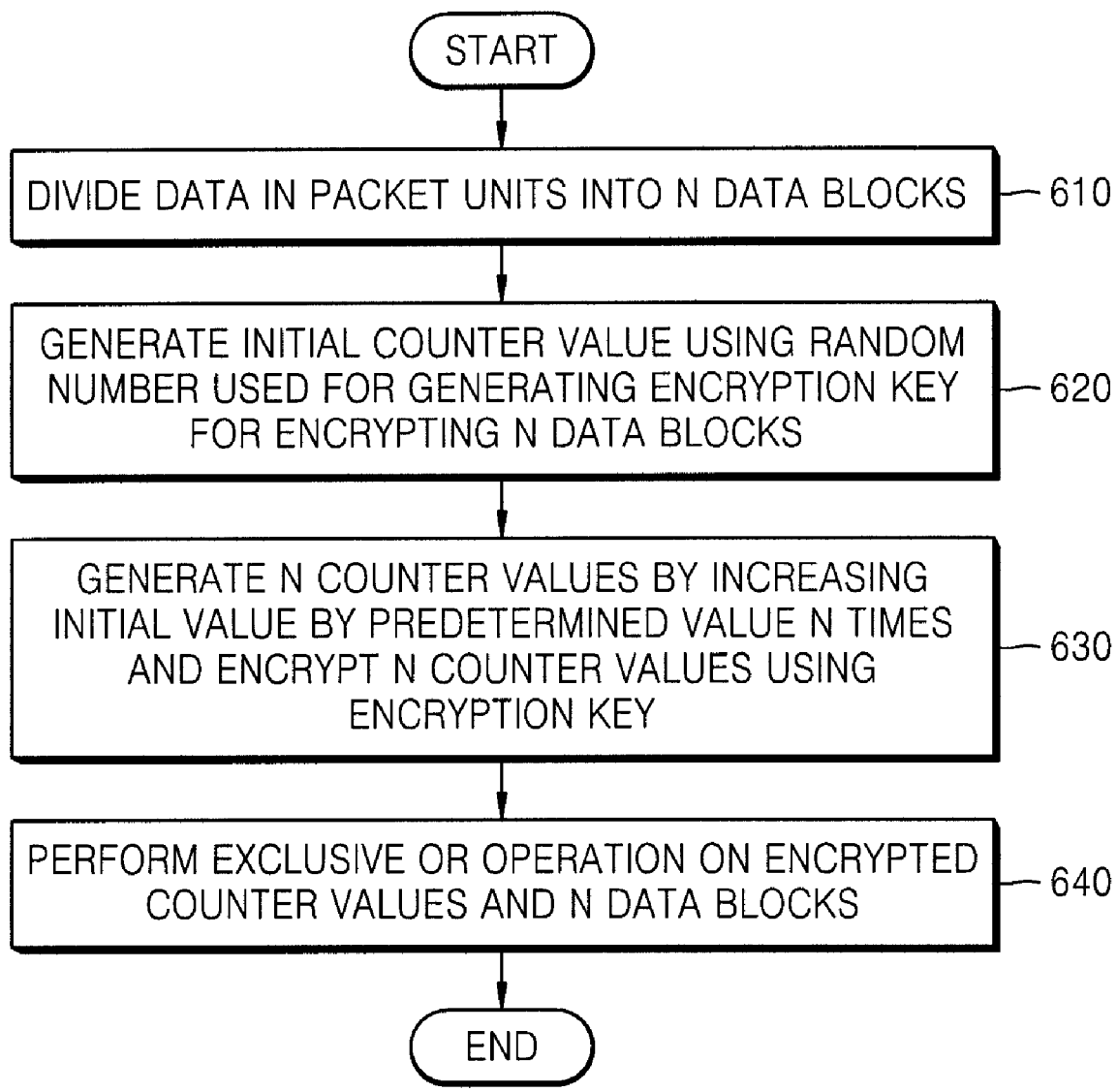
FIG. 6 is a flowchart illustrating a method of encrypting data, according to an exemplary embodiment of the present invention.

FIG. 6 is a flowchart illustrating a method of encrypting data, according to an exemplary embodiment of the present invention.

In operation 610, data in packet units is divided into N data blocks.

In operation 620, an initial counter value is generated using a random number used for generating an encryption key for encrypting the data blocks.

In operation 630, N counter values are generated by increasing the initial value by a predetermined value N times, and the N counter values are encrypted using the encryption key.

In operation 640, an exclusive OR operation is performed on the encrypted counter values and the data blocks.

The exemplary embodiments of the present invention can be written as computer programs and can be implemented in general-use digital computers that execute the programs using a computer readable recording medium. Examples of the computer readable recording medium include magnetic storage media (e.g. ROM, floppy disks, hard disks, etc.), and optical recording media (e.g. CD-ROMs, or DVDs).

The exemplary embodiments of the present invention allow fast and stable data encryption by dividing data in packet units into N data blocks, generating an initial counter value using a random number used for generating an encryption key for encrypting the data blocks, generating N counter values by increasing the initial value by a predetermined value N times, encrypting the N counter values using the encryption key, and performing an exclusive OR operation on the encrypted counter values and the data blocks.

While the present invention has been particularly shown and described with reference to exemplary embodiments thereof, it will be understood by those of ordinary skill in the art that various changes in form and detail may be made therein without departing from the spirit and scope of the invention as defined by the appended claims. The exemplary embodiments should be considered in a descriptive sense only, and not for purposes of limitation. Therefore, the scope of the invention is defined not by the detailed description of the invention but by the appended claims, and all differences within the scope will be construed as being included in the present invention.

What is claimed is:

1. A method of encrypting data, the method executed by a hardware processor, and comprising:
    dividing, by the hardware processor, data in packet units into N data blocks;
    generating, by the hardware processor, a random number used for generating an encryption key for encrypting the data blocks;
    generating, by the hardware processor, an initial counter value using the random number;
    generating, by the hardware processor, N counter values by increasing the initial counter value by a predetermined value N times and encrypting the N counter values using the encryption key; and
    performing, by the hardware processor, an exclusive OR operation on the N encrypted counter values and the N data blocks,
    wherein the N is an integer which is larger than 1.

2. The method of claim 1, wherein each of the N counter values comprises a bit representing the random number, a bit representing a transferred data block number, and a bit representing a counter.

3. The method of claim 1, wherein each of the N counter values comprises a bit representing the random number, a bit representing an additional random number which is different from the random number, and a bit representing a counter.

4. The method of claim 1, further comprising generating a packet formed of a plurality of data blocks from among the N data blocks on which the exclusive OR operation is performed with the N encrypted counter values, wherein each of the N counter values comprises a bit representing the random number, and a bit representing partial information of the packet.

5. The method of claim 4, wherein each of the N counter values further comprises a bit representing a counter.

6. The method of claim 1, further comprising generating a packet formed of a plurality of data blocks from among the N data blocks on which the exclusive OR operation is performed with the N encrypted counter values, wherein each of the N counter values comprises a bit representing the random number, a bit representing a number of the packet, and a bit representing a counter.

7. The method of claim 1, further comprising generating a packet formed of a plurality of data blocks from among the N data blocks on which the exclusive OR operation is performed with the N encrypted counter values, wherein the initial counter value is changed for each packet.

8. The method of claim 7, wherein the initial counter value is increased by a predetermined value for each packet.

9. The method of claim 1, further comprising generating the encryption key based on copy control information of the data, the random number, and an exchange key shared by apparatuses for encrypting and decrypting data.

10. The method of claim 1, wherein the random number is periodically changed.

11. The method of claim 1, wherein the random number is periodically increased by a predetermined value.

12. The method of claim 1, wherein each data block is 128 bits, each counter value is 128 bits, and the random number is equal to or greater than 64 bits.

13. The method of claim 7, wherein the packet comprises a region which represents the random number.

14. The method of claim 7, wherein the packet comprises a region which represents whether the random number is an odd number or an even number in order to represent whether the random number has changed.

15. An apparatus for encrypting data, the apparatus comprising:
    a data division hardware unit which divides data in packet units into N data blocks;
    a random number generation unit which generates a random number used for generating an encryption key for encrypting the data blocks;
    a counter generation unit which generates an initial counter value using the random number and generates N counter values by increasing the initial counter value by a predetermined value N times;

an encryption unit which encrypts the N counter values using the encryption key; and an operation unit which performs an exclusive OR operation on the N encrypted counter values and the N data blocks, wherein the N is an integer which is larger than 1.

16. The apparatus of claim 15, wherein each of the N counter values comprises a bit representing the random number, a bit representing a transferred data block number, and a bit representing a counter.

17. The apparatus of claim 15, wherein each of the N counter values comprises a bit representing the random number, a bit representing an additional random number which is different from the random number, and a bit representing a counter.

18. The apparatus of claim 15, further comprising a packet generation unit which generates a packet formed of a plurality of data blocks from among the N data blocks on which the exclusive OR operation is performed with the N encrypted counter values.

19. The apparatus of claim 18, wherein each of the N counter values comprises a bit representing the random number, and a bit representing partial information of the packet.

20. The apparatus of claim 19, wherein each of the N counter values further comprises a bit representing a counter.

21. The apparatus of claim 18, wherein each of the N counter values comprises a bit representing the random number, a bit representing a number of the packet, and a bit representing a counter.

22. The apparatus of claim 18, wherein the counter generation unit determines the initial counter value to be changed for each packet.

23. The apparatus of claim 22, wherein the counter generation unit determines the initial counter value to be increased by a predetermined value for each packet.

24. The apparatus of claim 15, further comprising an encryption key generation unit which generates the encryption key based on copy control information of the data, the random number, and an exchange key shared by apparatuses for encrypting and decrypting data.

25. The apparatus of claim 15, wherein the random number generation unit periodically changes the random number.

26. The apparatus of claim 15, wherein the random number generation unit periodically increases the random number by a predetermined value.

27. The apparatus of claim 15, wherein each data block is 128 bits, each counter value is 128 bits, and the random number is equal to or greater than 64 bits.

28. The apparatus of claim 18, wherein the packet comprises a region which represents the random number.

29. The apparatus of claim 18, wherein the packet comprises a region which represents whether the random number is an odd number or an even number in order to represent whether the random number has changed.

30. A non-transitory computer readable recording medium having embodied thereon instructions that, when executed by a computer, causes the computer to execute a method of encrypting data, the method comprising:

dividing data in packet units into N data blocks;

generating an initial counter value using a random number used for generating an encryption key for encrypting the data blocks;

generating N counter values by increasing the initial counter value by a predetermined value N times and encrypting the N counter values using the encryption key; and performing an exclusive OR operation on the N encrypted counter values and the N data blocks, wherein the N is an integer which is larger than 1.

* * * * *